Patented Sept. 20, 1938

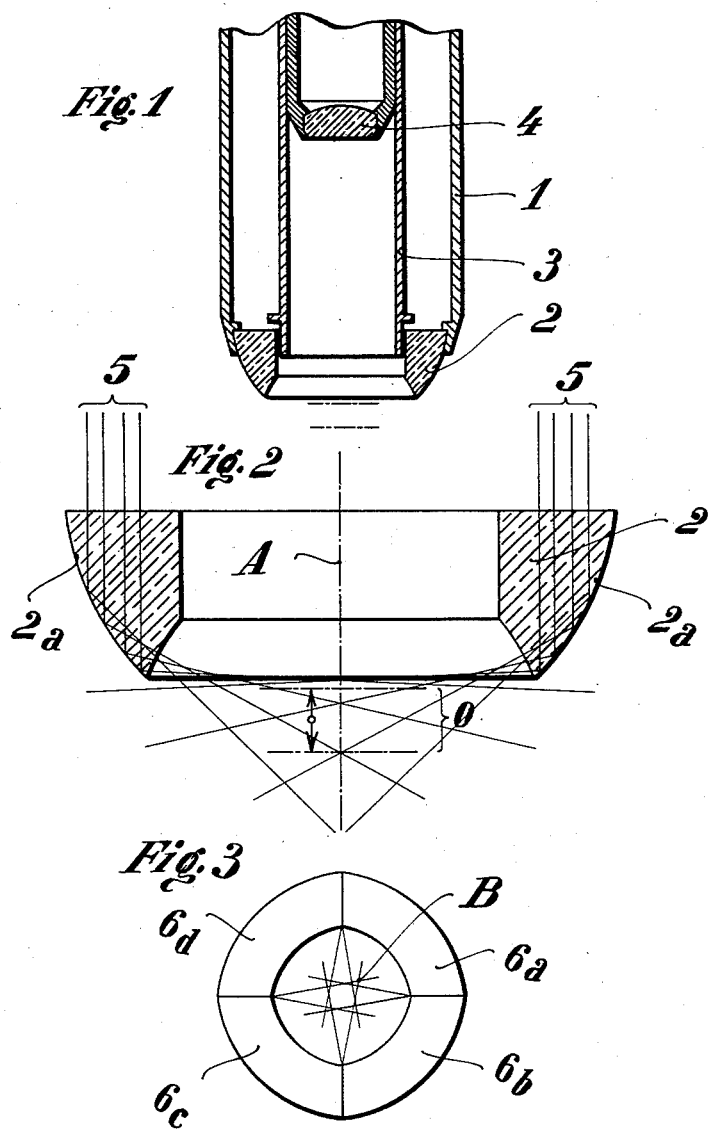

2,130,494

UNITED STATES PATENT OFFICE 2,130,494

RELIEF CONDENSER

Hermann Heine, Wetzlar, Germany, assignor to Ernst Leitz, G. m. b. H., Wetzlar, Germany Application August 7, 1936, Serial No. 94,731
In Germany August 12, 1935

2 Claims. (Cl. 88—40)

The object of this invention is to provide a light reflecting ring condenser for illuminating an object on the surface thereof as well as in planes below the surface whereby to cause the object to appear in relief. With this object in view the invention is embodied in a light reflecting ring condenser provided with a reflecting surface which is curved in such a manner that the reflected light rays meet in several individual and separate light zones or planes as distinguished from reflections meeting in but a single plane, point or zone.

Ring condensers, the reflected rays of which are joined or meet in different planes are known in the art. They consist however of several reflecting surfaces, particularly cone surfaces, which first reflect the rays in two different directions before they are reflected as a bundle of parallel rays. Such devices require a more complicated construction, the rays are reflected upon the object under the same angle in all planes or light zones so that the relief effect is poor and insufficient, and they are expensive.

These disadvantages are eliminated in the present invention by a construction in which the bundle of incoming parallel illuminating rays is reflected from a curved, particularly spherically formed, reflecting surface in such a manner that the reflected rays from one circular zone in the condenser illuminate and meet in a plane different from those of all the other reflected rays whereby the rays are distributed over the object to obtain the relief effect.

Such a construction causes the surface of the object to be illuminated in a direction more parallel to the said surface than the directions in which the portions underneath the surface or in planes below the surface are illuminated.

Another object of the invention is to provide a ring condenser consisting of sectors, the total length of which is less than that of the circumference of the original circle whereby the rays from each sector is reflected in a focal point different from the focal points of the other sectors.

In the accompanying drawing illustrating the invention, Fig. 1 is a sectional view of an objective provided with a ring condenser embodying the invention. Fig. 2 is a sectional view of the glass body of the ring condenser. Fig. 3 is a diagrammatic view of a ring condenser consisting of four sectors.

The ring condenser 2 is mounted in a tubular casing 1 which supports an inner tube 3 and an objective 4, the parts being assembled in any suitable manner. The opposed walls of the tubes 3 and 4 are painted dull or otherwise made nonreflecting so that only directed and no reflected light passes through the circular space between them.

The ring condenser 2 is provided with a single ring formed spherically curved reflecting surface 2a which reflects the incoming parallel bundle of light rays indicated at 5 from an indefinite number of reflecting points some of which are indicated in the drawing whereby to reflect such light rays in a manner that an object indicated at O is illuminated under different angles and in different depths. All the reflected rays meet in the optical axis A of the objective, i. e. they meet in one focal axial line.

The condenser in Figure 3 consists of four sectors 6a, 6b, 6c and 6d of the ring condenser 2. Each of said sectors is less than one quarter the circumferential length of the condenser 2 so that the total circumferential length of the ring condenser shown in Fig. 3 is less than the original circumference of the ring condenser 2 so that the reflected rays meet in four different focal points indicated at B in lines parallel with but displaced from the optical axis A of the device.

Ring condensers constructed in accordance with this invention are used to advantage with relatively small magnifications for illuminating not only the surfaces of objects but also portions thereof below the surfaces so as to obtain relief effects and afford assistance in examining the bodies or constructions of the objects. For instance, paper, fabrics and like elements or substances may be examined.

Although the drawing illustrates only four rays 5 for the sake of clearness, it will be obvious that a continuous curved reflecting surface contains an indefinite number of reflecting points and that the reflected light is a diffused light which illuminates the entire object, the latter appearing in relief.

I claim:—

1. A device for illuminating an object on the surface thereof as well as in planes below its surface whereby to obtain relief effects including an inner tube, an outer tube surrounding the inner tube and spaced therefrom, the opposed walls of said tubes being nonreflecting, a ring condenser supported between said tubes at the lower ends thereof, said ring condenser having an outer spherically curved reflecting surface facing the optical axis of the inner tube for receiving parallel light rays passing downward between the tubes and reflecting the same towards an object in said optical axis for illuminating the said object the rays after reflection being spherically dispersed afocal.

2. A device according to claim 8 characterized by the ring condenser consists of four curved sectors forming a ring, each of said sectors having a circumferential length less than one quarter of the ring from which said sectors are cut whereby to reflect the light rays in four different optical axes in lines parallel with but displaced from the optical axis of the device.

HERMANN HEINE.

CERTIFICATE OF CORRECTION.

Patent No. 2,130,494. September 20, 1938.

HERMANN HEINE.

It is hereby certified that error appears in the printed specification of the above numbered patent requiring correction as follows: Page 1, second column, line 52, claim 2, for the claim reference numeral "8" read 1; and that the said Letters Patent should be read with this correction therein that the same may conform to the record of the case in the Patent Office.

Signed and sealed this 15th day of November, A. D. 1938.

Henry Van Arsdale (Seal)   Acting Commissioner of Patents.